(12) United States Patent
Gross

(10) Patent No.: US 7,878,912 B2
(45) Date of Patent: Feb. 1, 2011

(54) CARDANIC CROSS JOINT WITH INSULATION

(75) Inventor: Norbert Gross, Duesseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/393,809

(22) Filed: Feb. 26, 2009

(65) Prior Publication Data

US 2009/0233722 A1 Sep. 17, 2009

Related U.S. Application Data

(62) Division of application No. 11/276,053, filed on Feb. 10, 2006, now Pat. No. 7,517,283.

(30) Foreign Application Priority Data

Feb. 11, 2005 (EP) .................................. 05100999

(51) Int. Cl.
*F16D 3/43* (2006.01)
(52) U.S. Cl. ........................................ 464/88; 464/125
(58) Field of Classification Search .................. 464/87, 464/88, 92, 125
See application file for complete search history.

(56) References Cited

U.S. PATENT DOCUMENTS

| 197,495 | A | 11/1877 | Ralston |
|---|---|---|---|
| 1,180,468 | A | 4/1916 | Bartlett |
| 1,456,068 | A | 5/1923 | Lord |
| 1,642,775 | A | 9/1927 | Henry |
| 1,694,064 | A | 12/1928 | Jencick |
| 1,702,363 | A | 2/1929 | Peters |
| 1,855,640 | A | 4/1932 | Lord |
| 2,024,777 | A | 12/1935 | Neumann |
| 2,537,847 | A * | 1/1951 | Neher .......................... 464/88 |
| 3,342,041 | A | 9/1967 | Nebiker |
| 4,121,437 | A | 10/1978 | Michel |
| 4,229,951 | A | 10/1980 | Jedlicka |
| 4,412,827 | A | 11/1983 | Petrzelka et al. |

(Continued)

FOREIGN PATENT DOCUMENTS

DE 10001270 7/2001

(Continued)

OTHER PUBLICATIONS

Abstract for WO 01/51823 (Above).

(Continued)

*Primary Examiner*—Greg Binda
(74) *Attorney, Agent, or Firm*—O'Brien Jones, PLLC

(57) ABSTRACT

A universal joint comprises first and second joint yokes, each joint yoke having axially opposite yoke arms, and inner and outer sides with respect to an axis of symmetry of the joint; first and second connection elements, each having transverse arms for connecting the connection element to yoke arms of a respective joint yoke and a base web extending beyond the transverse arms in a direction away from the axis of symmetry of the joint; and an elastic coupling element guided around outer sides of the joint yokes and connected to the base web of each connection element at a location beyond the transverse arms in a direction away from the axis of symmetry of the joint.

17 Claims, 6 Drawing Sheets

U.S. PATENT DOCUMENTS

| | | |
|---|---|---|
| 4,850,933 A | 7/1989 | Osborn |
| 5,267,904 A | 12/1993 | Geisthoff |
| 5,551,919 A | 9/1996 | Cherpician |
| 6,026,703 A | 2/2000 | Stanisic et al. |
| 6,685,569 B2 | 2/2004 | Kurzeja et al. |
| 6,893,350 B2 | 5/2005 | Menosky et al. |
| 6,923,726 B1 | 8/2005 | Lindenthal et al. |
| 2004/0152526 A1 | 8/2004 | Sekine |
| 2004/0224778 A1 | 11/2004 | Menosky et al. |

FOREIGN PATENT DOCUMENTS

| | | |
|---|---|---|
| EP | 0 160 599 A1 | 4/1985 |
| EP | 0 160 599 B1 | 7/1988 |
| EP | 0 361 745 A1 | 4/1990 |
| EP | 0 563 940 A2 | 10/1993 |
| EP | 0 563 940 B1 | 11/1998 |
| EP | 0 967 411 | 12/1999 |
| FR | 2138424 | 1/1973 |
| FR | 2568329 | 1/1986 |
| GB | 851174 | 10/1960 |
| GB | 942495 | 11/1963 |
| SU | 606021 | 5/1978 |
| WO | WO 01/51823 | 7/2001 |

OTHER PUBLICATIONS

Abstract for FR 2568329 (Above).
Abstract for DE 10001270 (Above).
Abstract for EP 0 160 599 (Above).
Search Report for EP 05100987.
Search Report for EP 05100999.
Search Report for EP 05100997.
Search Report for EP 05100994.
Search Report for EP 05100992.

* cited by examiner

CARDANIC CROSS JOINT WITH INSULATION

This is a division of application Ser. No. 11/276,053 filed on Feb. 10, 2006 U.S. Pat. No. 7,517,283, which claims the benefit of European Patent 05100999.1, filed Feb. 11, 2005, both of which are incorporated herein by reference.

The present invention is related to U.S. Pat. No. 7,445,555 entitled "Axial Insulation for a Universal Joint", U.S. patent application serial number 11/276,049 entitled "Axial Insulation for a Universal Cross Joint", U.S. Pat. No. 7,445,554 entitled "Insulation for Universal Cross Joint", and U.S. Pat. No. 7,488,256 entitled "A Universal Cross Joint with Axial Insulation", filed simultaneously herewith.

FIELD OF THE INVENTION

The invention relates to a cardan joint having two joint yokes, wherein one of the joint yokes is connectable or connected with a driven shaft or a drive shaft, and the other joint yoke is connectable or connected to a shaft to be driven or a drive shaft.

BACKGROUND OF THE INVENTION

Cardan or universal joints are usually used when two torque-transmitting shafts whose aligned orientation is not always ensured are to be connected with each other. The universal joint then usually consists of two opposing joint yokes that are arranged twisted radially at an angle of 90° in relation to each other that each represent one end of the two shafts that are to be connected in an articulated manner. The cross member, which consists of two pin bearers offset against each other by 90°, is disposed between the joint yokes, the cross member being made of one piece so that the two pin bearers are rigidly connected with each other. The pin bearers are each supported, pivotally about their axes, in the two joint yokes.

With regard to the transmission of driving forces, the skilled person is regularly presented with the task of transmitting the rotational movement on the one hand, but, on the other, of eliminating vibrations and shocks if possible. Such interferences may, for example, be caused by vibrations from the drive unit. This problem is especially noticeable in automobile engineering, in particular in the area of the drive train, for example in the area of the cardan shaft where the vibrations between drive assembly and rear axle are transmitted without hindrance, and in the area of the steering line or in the steering column where, should conventional cardan joints be used, no insulation whatsoever is effected against low-frequency vibrations or shocks imposed by road bumps. Such interferences may, on the one hand, lead to damages in the drive train or the steering column and/or to adverse effects of an acoustic or mechanical nature for the driver.

For the purpose of uncoupling with regard to acoustics or vibration dynamics, in particular in the steering column, it is, for example, known to use a torsional elastic coupling with a so-called Hardy disk as an axially elastic coupling element or a loop disk. The Hardy disk is disposed, for example, in the steering column between the bottom universal joint and a steering housing or steering gear or between the universal joints. The Hardy disk, which is rigid in the direction of rotation, is formed such that it is soft in the direction of the steering column. As required by principle, the bending stiffness of the Hardy disk is relatively small. This causes a distortion of the Hardy disk by the bending moments from the universal joint, if the Hardy disk is arranged in series with the universal joint, as is common. Since a Hardy disk alone (without a cardan joint), at least given appropriate life expectancies, is not suitable for connecting non-aligned shafts, the number of components is disadvantageously increased with the necessary arrangement in series with the cardan joint. Furthermore, the axial constructional space is increased thereby, and the usual compensation of the discontinuities by means of two cardanic joints arranged in anti-phase is disturbed by the additional Hardy disk since it works like an additional joint when placed in series.

The following is a discussion of relevant art pertaining to cardan joints. The discussion is provided only for understanding of the invention that follows. The summary is not an admission that any of the work described below is prior art to the claimed invention.

EP 0 563 940 B1 discloses a universal joint comprising two forks which are situated opposite one another with a 90° offset and which are each a part of each one of two shafts which are to be pivotally interconnected, or which are adapted each to be connected to each one of two shaft ends which are to be pivotally interconnected, and comprising two journal pairs which are offset by 90° from another and which form a journal cross and which are rotatable about their axis in the respective fork ends and, relative to the rotational axis of the shafts, are mounted for torque transmission, the two journal pairs being at least slightly pivotable relatively to one another in the plane formed by the journal cross, each journal being mounted in an anchor bracket and adjacent anchor brackets are interconnected by an elastic coupling element, whereby the elastic coupling element contains reinforcing inlays in loop form, which are disposed to be stationary and which each interconnect two adjacent anchor brackets and in that the reinforcing inlays in loop form are situated along the periphery of the universal joint in a loop plane which is perpendicular to the plane of the journal cross.

It must be regarded as a main disadvantage of the cross joint disclosed in EP 0 563 940 B1 that the two pairs of pins connect the own pins with each other integrally in different ways: The one pair uses a through bolt, the other pair is configured from two short pins that are connected with each other by means of an additional connecting portion. For this reason, a different production tool is required for the production of each pin or pair of pins, which makes the production of the cross joint extremely cost-intensive.

It is a further disadvantage that the cross joint disclosed in EP 0 563 940 B1 takes a lot of constructional effort and is thus very susceptible to malfunction. It must be considered as a further disadvantage that the yokes must be designed small with regard to width and that thus, their yoke bearings must be designed to be bigger (more expensive) in order to transmit a sufficient torque given reasonable construction dimensions. If the flexible ring is damaged in the cross joint of EP 0 563 940 B1, a replacement ring must be supplied via the anchors. In addition, the cross joint is difficult to balance, especially in the case of shafts that rotate quickly.

EP 0 160 599 describes a flexible coupling device comprising first and second yokes which are intended to be fixed, respectively, to a drive member and a driven member, which each have arms arranged so that the arms of the first yoke are interposed with those of the second yoke, whereby to each yoke is fixed a support and these two supports are arranged opposite each other so that the facing surfaces of these supports are substantially perpendicular to the rotation axis of the device, in that an elastomeric linking element is fixed to these facing surfaces of the supports, and in that each support is fixed to the corresponding yoke by means of a spindle engaging in at least one opening in said support and in holes provided in the arms of said yoke.

GB 942,495 discloses a universal coupling for shafts comprising a flexible disc having coupling elements extending one on each side thereof, each for connection to one of the shafts to be coupled, the coupling elements being pivoted to the disc about axes at right angles and lying normally to the axis of the disc whereby, in use of the coupling, angular misalignment of the coupled shafts may be accommodated by pivoting of the coupling elements without flexure of the disc, the disc being composed wholly or mainly of plastic, rubber or the like resilient material which is unrestrained so as to be free to flex during use of the coupling.

It must be considered as a main disadvantage of the connection for shafts disclosed in GB 942,495 that the coupling elements are rotated with clearance towards the disk and with significant friction, the torsion clearance and the friction merely satisfying modest demands.

Therefore, what is needed is an improved universal joint of the type mentioned at the beginning with simple means in such a way that it is cheaper to produce from an economic standpoint, without the elastic coupling element having to convey significant bending moments.

SUMMARY OF THE INVENTION

This invention provides a universal joint for coupling a drive shaft and a driven shaft comprising two joint yokes. Each yoke has bearing elements at axially opposite yoke arms. One joint yoke is connected with the driven shaft and the other joint yoke is connected to the drive shaft. The two joint yokes are arranged radially at an angle of 90° in relation to each other to form an internal space. The invention includes a pair of identical connection elements having pins being pivotally supported in the bearings of the respectively associated joint yoke arms. The universal joint further comprises an elastic coupling element. The connection elements are spatially separated from one another and are connected to each other via the elastic coupling element.

Because of the identical form of the two connection elements, the respective connection elements may be produced or processed in a single production tool. In this manner, a universal joint is provided which can clearly be manufactured cheaper in production for economic reasons, because the respective connection elements can be manufactured or processed with only a single production tool, at the same time making a reduction of logistical and storage costs possible since a separate storage or a provision of different pin bearers, for example, just in time, can be omitted.

Advantageously, a hitherto commonly used elastic uncoupling member arranged in series (additional elastic coupling) can thus be done without in the universal joint according to the invention. The elastic coupling element is advantageously arranged parallel to the universal joint. Within the sense of the invention, a parallel arrangement means that the elastic coupling element is directly associated with the universal joint. Thus, the universal joint as a unit with the elastic coupling element integrated into the joint is easier and cheaper to produce. In addition, a universal joint is provided which satisfies high demands with regard to torsion clearance and to the bearing friction.

It is favorable within the sense of the invention if the pins of each of the connection elements, in relation to an axis of symmetry, each reach, radially counter-directionally, into the associated yoke arms or the bearings disposed therein.

It is expediently provided in a preferred embodiment that the pins reach into the yoke arms or into the bearings disposed therein in a direction oriented from the internal space towards an outer side of the yoke arms opposite to the internal space. Here, pins with their free ends are arranged outside with respect to the middle axis of the joint.

In a further preferred embodiment, it is favorable within the sense of the invention if the pins reach into the yoke arms or into the bearings disposed therein in a direction oriented from the outer side of the yoke arms opposite to the internal space towards the internal space. Here, pins with their free ends are arranged inside with respect to the middle axis of the joint.

However, it may expediently also be provided that the pins of each of the connection elements, in relation to the middle axis of the joint, each reach, oriented equi-directionally, into the yoke arms or into the bearings disposed therein with the connection elements preferably being formed asymmetrically.

Here, it is favorable within the sense of the invention if, in relation to the middle axis of the joint, one of the pins reaches into the associated yoke arm or into the bearing disposed therein in a direction oriented from the outer side of the yoke arms opposite to the internal space towards the internal space, the opposite pin of the same connection element reaching into the yoke arm or into the bearing disposed therein in a direction oriented from the internal space towards the outer side. Here, with respect to the middle axis of the joint, the pins of the respectively same connection element are arranged alternately, one of the pins being arranged on the inside and the other pin being arranged on the outside. This is especially advantageous with regard to the simple radial insertion of the connection elements into the joint yokes when assembling the universal joint.

In the case of the alternate arrangement of the pins, it is expediently provided that that joint yokes with yoke arms have different distances with regard to the middle axis of the joint. In contrast however, when the pins are arranged on the same side, the yoke arms expediently have the same distance with respect to the axis of symmetry.

The elastic coupling element is disposed in the internal space as a torsion-resistant, flexural elastic or axially elastic disk, for example, a Hardy disk. However, the elastic coupling element may also be disposed in the internal space as a torsion-resistant, flexural elastic or axially elastic ring, e.g. annulus, or multi-angular or polygonal ring. Furthermore, the elastic coupling element may also be disposed around the outer sides of the joint yokes or their yoke arms as a torsion-resistant, flexural elastic or axially elastic ring, e.g. annulus, or multi-angular or polygonal ring.

The elastic coupling element may, for example, consist of rubber or the like. A screw joint, rivet joint, vulcanization or the like can, for example, be provided as the connection of the elastic coupling element with the connection elements or the pair of connection elements formed therefrom.

The universal joint according to the invention is particularly suitable for use in a steering column of a motor vehicle, wherein axial shocks can be filtered out as compared to a conventional universal joint. This behavior is especially desirable in structures of steering columns because thus, axial shocks, for example due to stimuli from the road, can be kept away from a steering wheel without having to make sacrifices with regard to torsional stiffness. By integration of the elasticity through the doubly pivotally supported elastic coupling element into or around the universal joint, it is avoided that a bending stiffness must also be provided, in addition to the axial compliance. By means of the universal joint according to the invention, the axial compliance can be made greater so that insulation properties are also improved over conventional elastic couplings in structures of steering columns. The integrated elastic coupling element does not have to convey significant bending moments because the elastic coupling element is kept free of bending by bearings in the axis of the moments. This makes ideal compliance properties in axial direction without bending resistances with optimal stiffness in the direction of rotation possible. The large axial compliance of the joint can favor omitting an otherwise commonly used slip joint from the steering column, which has to compensate fitting tolerances and stimuli from the road. In addition, the universal joint according to the invention, if formed with a disk, can be produced with comparably large yoke widths and, advantageously, with correspondingly small-sized yoke bearings in an appropriate size, with much larger torques being transmittable than in a universal joint with small yoke widths and larger (more expensive) yoke bearings. In addition, the integration of the ring according to the invention permits a simple conveying of the flexible ring in axial direction.

The invention can further include one or more features being subject matter of the dependant claims. Modes for carrying out the present invention are explained below by reference to non limiting embodiments of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

Further advantageous embodiments of the invention are disclosed in the dependent claims and the following description of the figures. In the figures:

In the different figures, the same parts are always provided with the same reference numeral so that they are also only described once, as a rule.

DETAILED DESCRIPTION OF THE INVENTION

Figure 2:
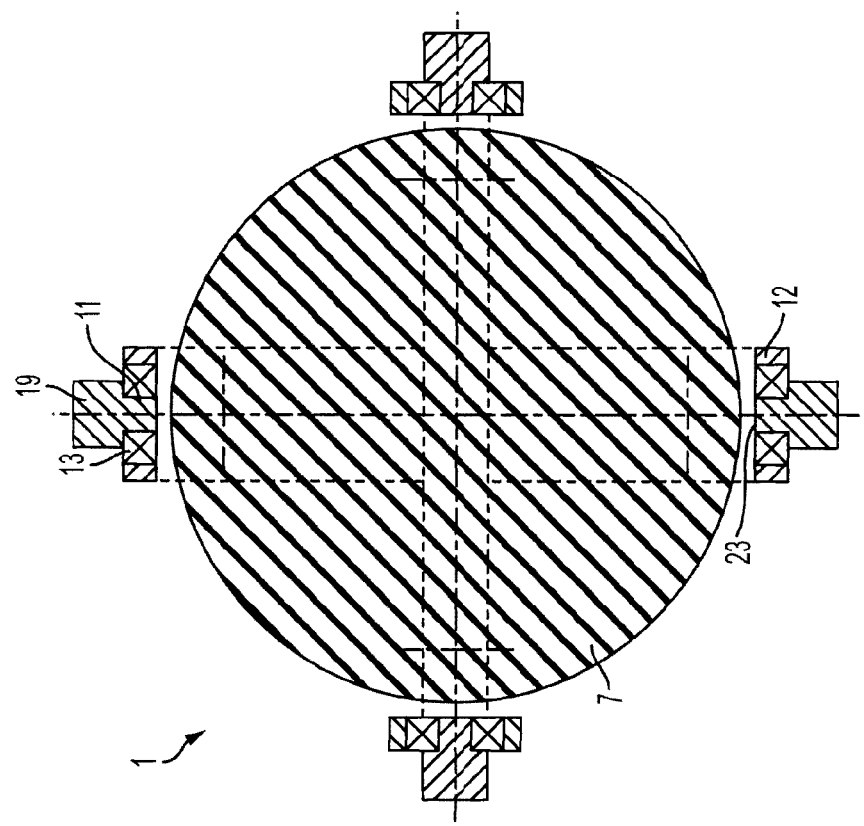
FIG. 2 shows a representation along a section A from FIG. 1.
Figure 1:
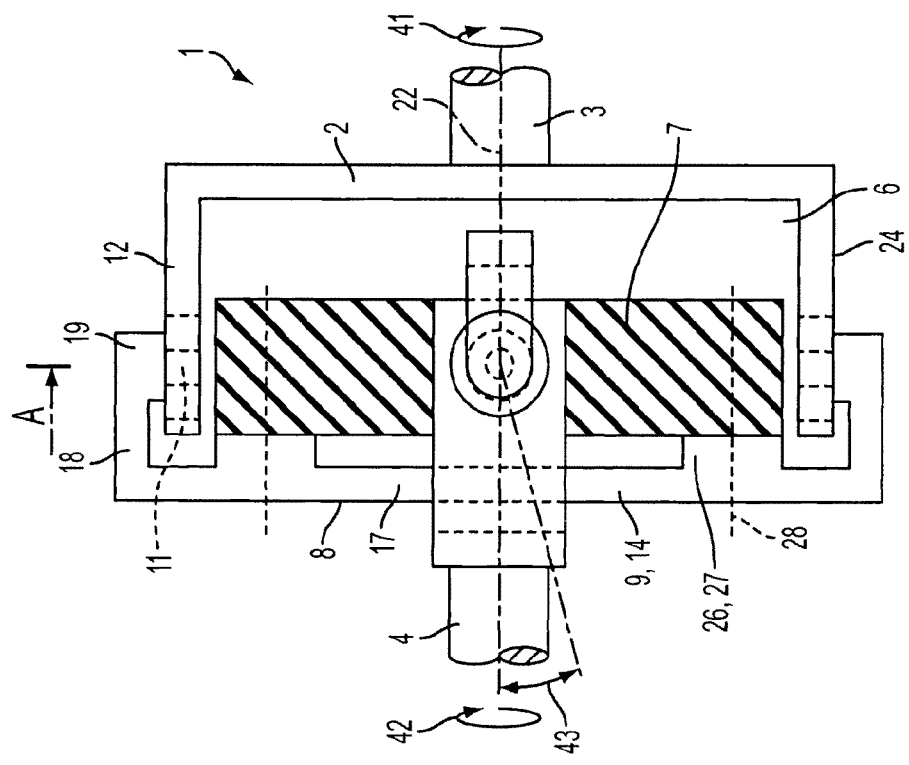
FIG. 1 shows a side view of a universal joint.

The FIGS. 1 to 12 show a universal joint 1 having two joint yokes 2. In FIGS. 1 and 2, one of the joint yokes 2 is connected to a driven shaft 3 or drive shaft 3, the other joint yoke 2 being connected to the shaft 4 to be driven or drive shaft 4. The two joint yokes 2 are arranged twisted radially at an angle of 90° in relation to each other so that the two joint yokes 2 form an internal space 6. An elastic coupling element 7 is associated with the universal joint 1. A pair 8 of connection elements formed of two identical, spatially separate connection elements 9 is associated with the joint yokes 2. The connection elements 9 with their pins 11 respectively arranged thereon are pivoted in bearings 13 in the respectively associated joint yokes 2 or in their yoke arms 12. The connection elements 9 are connected with each other via the elastic coupling element 7. Because of the selected side view in the FIGS. 1, 5, 7, 9 and 11, or because of the selected longitudinal section in FIG. 3, only one joint yoke 2, 102, 202, 302, 402, 502, respectively, with its two yoke arms 12, 112, 212, 312, 412, 512, or only one connection element 9, 109, 209, 309, 409, 509 with its two transversal webs 18, 118, 218, 318, 418, 518 are discernible in their entirety.

The bearings 13 in the yoke arms 12 are designed as single-row bearings with a axis of rotation that is radially oriented, for example, as anti-friction bearing, e.g., as needle or ball bearings, but they may also be designed as plain bearings. At least one of the two bearings 13 per joint yoke 2 is able to accept radial joint forces in addition to the axial joint forces. The bearings 13 are fixed in a suitable manner, radially relative to an axis of the joint, in the joint yokes 2 or their yoke arms 12. Possible embodiments are, for example, press fit, bonding or positive fit (abutting at the shoulder, spring ring or the like) of the outer races of the bearing in the joint yokes 2 or their joint arms 12.

In the FIGS. 1 to 6, the connection elements 9, 109, 209 are formed as additional connection yokes 14, 29, 32; 114, 129, 132; 214, 229, 232. The connection yokes 14, 29, 32; 114, 129, 132; 214, 229, 232 each have a base web 17, 117, 217 and transversal arms 18, 118, 218 arranged on the end thereof. The transversal arms 18, 118, 218 merge into a pin section 19, 119, which respectively bears the pin 11, 111, 211.

In the embodiment shown in FIGS. 1 and 2, the pins 11, in relation to a middle axis 22 of the joint, each reach counter-directionally into the associated yoke arms 12 or the bearings 13 placed therein. With their free ends 23, the pins 11 are oriented from an outer side 24 opposite the internal space 6 towards the internal space 6. The pin section 19 and thus, the pin 11, is arranged on the outside of the joint yokes 2 or their yoke arms 12 in relation to the middle axis 22 of the joint, the pin section 19 abutting a side of the bearings 13 pointing towards the outer side 24. Seen in the side view, therefore, the connection yokes 14 are slightly bigger than the joint yokes 2 or the symmetrical joint yokes 2 in order to grasp them with their transversal web 18 so that the pin 11 can reach into the bearings 13 from the outer side 24.

For the connection with the elastic coupling element 7, the base web 17 has attached connection areas 26 that are each offset in relation to the middle axis 22 of the joint. In relation to the axis of symmetry 22, the connection areas 26 have the same distance, and extend as appendages 27 axially in the direction towards the internal space 6. In this way, an axial interspace is created between the elastic coupling element 7 and the respective connection element 9 or the middle of its respective transversal web 18, which provides an axial clearance. This axial interspace can be produced by material integration of the connection areas 26 into the elastic coupling element 7 (as illustrated, for example, in FIGS. 3 and 4), together with a simplification of the transversal webs 18 of the connection elements 9.

The elastic coupling element 7, in the exemplary embodiment shown in the FIGS. 1 and 2, is formed as a disk, preferably as a torsion-resistant, flexural elastic or axially elastic disk, preferably as a Hardy disk, and is connected with the connection areas 26 or the appendages 27 in the internal space 6. However, it is also conceivable that the elastic coupling element 7 in the embodiment according to the FIGS. 1 and 2 may be formed as a torsion-resistant, flexural elastic or axially elastic ring or annulus. The elastic coupling element 7 consists of a rubber, for example. A screw joint, rivet joint, vulcanization or the like can, for example, be provided as the connection with the respective elastic coupling element 9 or the appendages 27 arranged on the connection yokes 14. In the FIGS. 1 and 2, the connection is in principle represented by a chain-dotted line 28.

Figure 4:
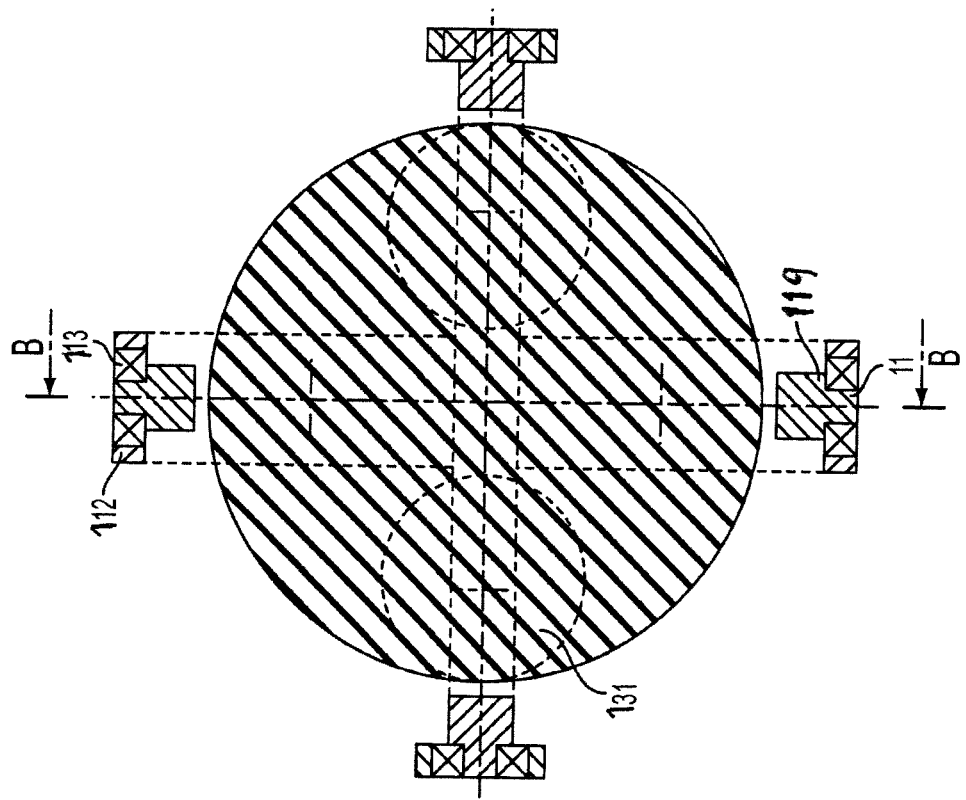
FIG. 4 shows a representation along a section A from FIG. 3.
Figure 3:
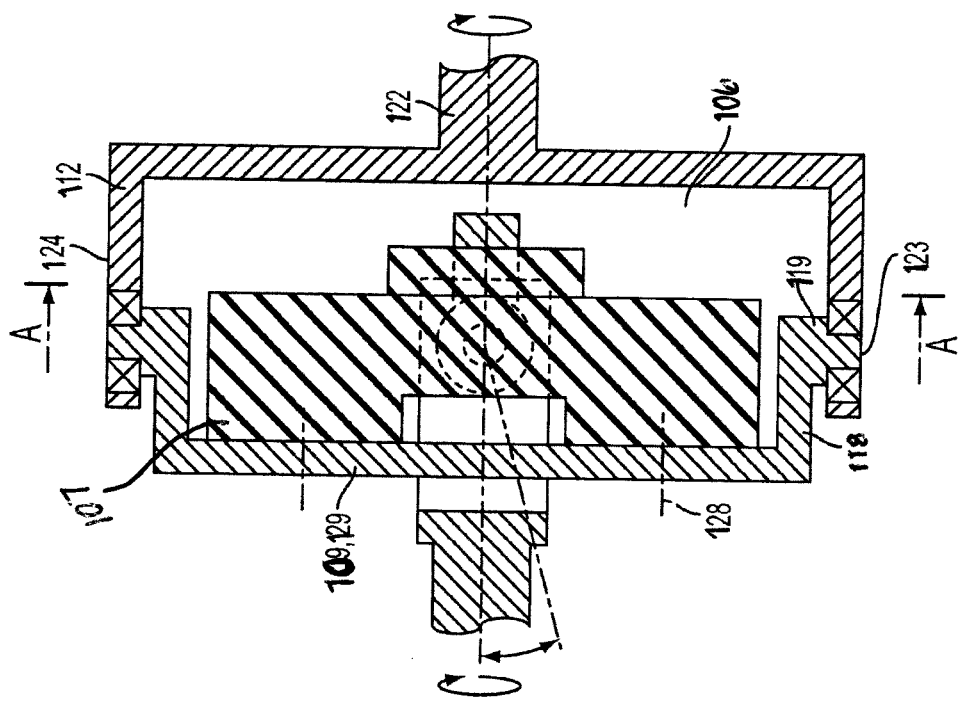
FIG. 3 shows a longitudinal section of a universal joint in a second embodiment.

A further embodiment of the universal joint according to the invention is shown in the FIGS. 3 and 4. In contrast to the exemplary embodiment shown in FIGS. 1 and 2, the pins 111 with their free end 123 reach into the joint yokes 102 or the bearings placed therein 113 in a direction oriented from the internal space 106 towards the outer side 124 opposite the internal space 106, but nevertheless counter-directionally in relation to the axis of symmetry 122.

In this embodiment, the connection elements 109 are formed as additional connection yokes 129. The connection yokes 129 have, like the connection yoke 14 of the embodiment according to the FIGS. 1 and 2, the base web 117 and transversal arms 118 arranged on the end thereof. The transversal arms 118 merge into the pin section 119 which respectively bears the pin 111.

With their base web 117, the joint yokes 129 are designed shorter than in the embodiment according to FIG. 1, because the transversal web 118 extends into the internal space 106. Thus, the pin section 119 with its pin is also arranged in the internal space 106, the pin section 119 abutting a side of the bearing 113 that points towards the internal space 106.

The connection yokes 129, seen in a side view, are formed smaller than a yoke width of the joint yokes 112 opposite each other, so that the joint yokes 129 can reach into the bearing 113 from the inside with their transversal web 118 or the pin section 119 with the pin 111.

The connection of the elastic coupling element 107 with the connection element 129 takes place directly at the base web 117. The axial clearance is achieved by round, attached screwed eyes 131 associated with the elastic coupling element 107, which is why, advantageously, a contouring of the connection yokes 129 corresponding to a contouring of the joint yokes 114 can be omitted.

In the FIGS. 3 to 4, the connection elements 109 can also be operated, in principle, rotated by 180° in the bearings 113 fastened against the elastic coupling element 107, which provides for additional adjustment options in the elastic coupling element 107 with different axial stiffness at tensile and compression stress. In the position shown, advantages with regard to the fail-safe-behavior result from the chained arrangement of the respective joint yoke 102 with the associated connection yoke 129, since the spatial association of the connection yoke 129 with respect to the associated joint yoke 102 is maintained in case of a failure of the elastic coupling element 107.

In other regards, the embodiment according to the FIGS. 3 and 4 corresponds to the embodiment according to FIGS. 1 and 2.

Figure 6:
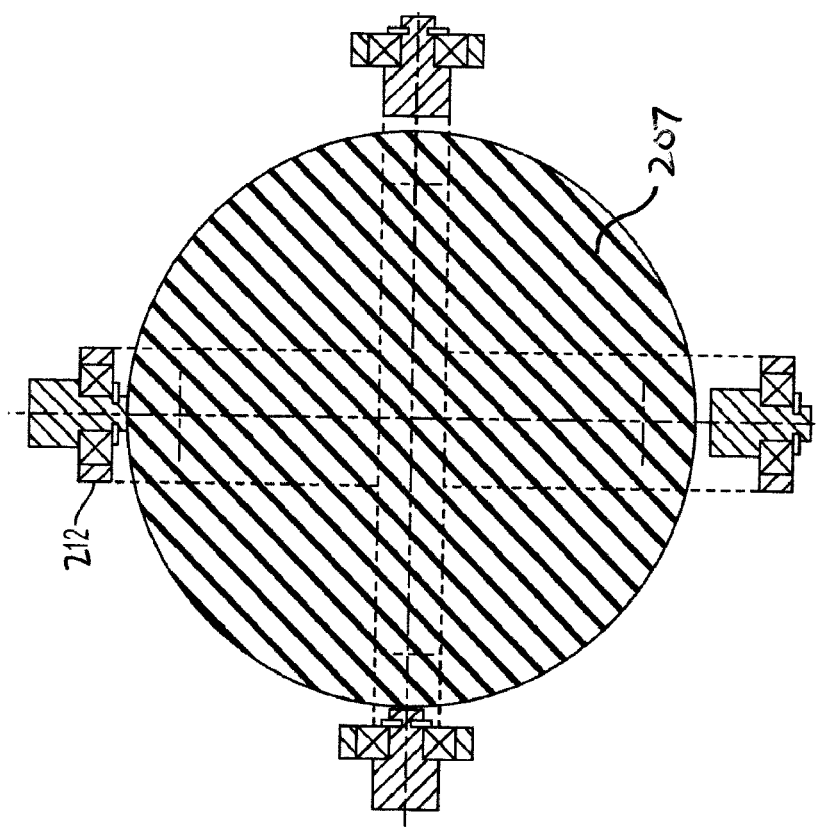
FIG. 6 shows a representation along a section A from FIG. 5.
Figure 5:
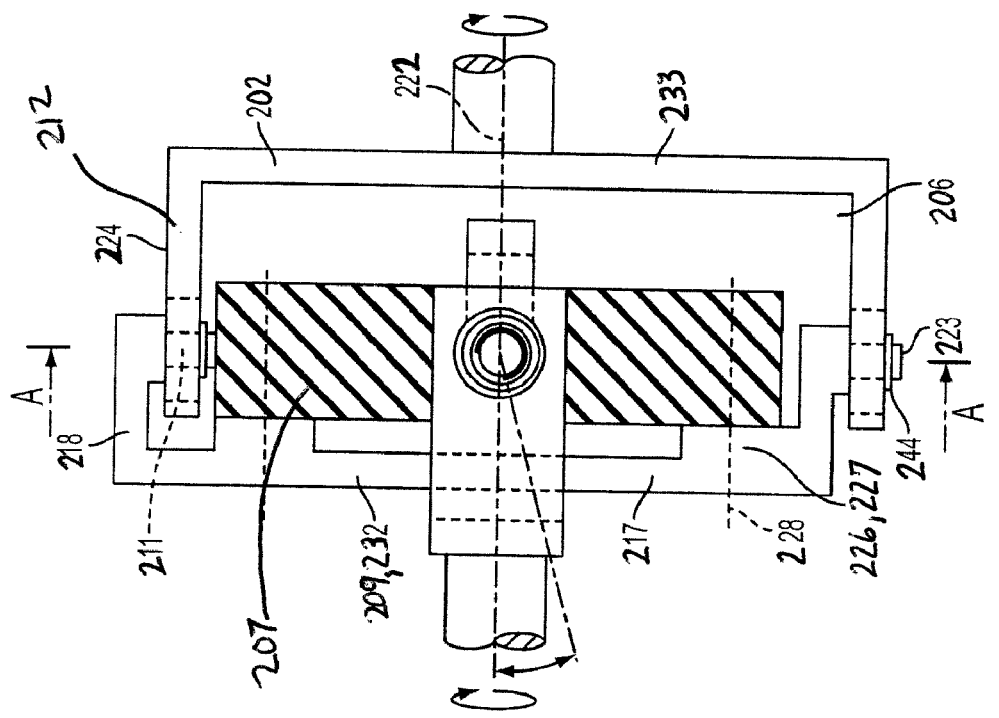
FIG. 5 shows a side view of a universal joint in a third embodiment.

A third advantageous embodiment of the universal joint according to the invention is shown in the FIGS. 5 and 6.

In this embodiment, the pins 211 reach, equidirectionally in relation to the middle axis 222 of the joint, into the associated joint yoke 202 or into the bearings 213 placed therein.

The connection elements 209 are formed as additional connection yoke 232 in a different way than in the explanations of the examples pertaining to FIGS. 1 to 4.

The joint yoke 232 has a base web 217 at each end of which the transversal web 218 is arranged which is associated with the pin section with the pin 211. The pins 211 extend with their free end 223 in the same direction, one of the pins, respectively, being oriented towards the middle axis 222 of the joint and the other one away from it. One of the pins, namely the pin 211, which points with its free end 223 towards the middle axis 222 of the joint, with its free end 223 reaches into the bearing 213 in a direction from the outer side 224 towards the internal space 206, its opposite pin 211, namely the pin 211, which points with its free end 223 away from the middle axis 222 of the joint, reaches into the bearing 213 in a direction from the internal space 206 outer side 224 towards outer side 224. Therefore, the pins 211 of the same connection yoke 229 reach in to the bearing 213 alternately. On the one hand, the pin section abuts the side of the bearing 213 pointing towards the outer side 224. On the other hand, the pin section opposite thereto abuts the side of the bearing 213 pointing towards the internal space 206. Therefore, the connection yoke 229 is supported alternately, namely once abutting the outside of the yoke and once abutting the inside of the yoke.

In order to obtain this alternate bearing, the connection yoke 232 has a base web 217 which, in relation to the middle axis 222 of the joint, has differently distanced transversal webs 218 so that the transversal webs 218 that are arranged opposite each other are arranged, on the one hand, on the outside, and on the other, on the inside. In the exemplary embodiment shown in FIG. 5, the base web 217 has a length corresponding to the length of the base web 233 of the joint yoke. However, the joint yokes 202, relative to the respectively associated connection yokes 229, are shifted radially by different degrees in the universal joint, in relation to the middle axis 222 of the joint.

As in the exemplary embodiment according to FIGS. 1 and 2, connection areas 226 or the appendages 227 are provided for the connection of the connection elements 232 with the elastic coupling element 207.

The elastic coupling element 107, 207 according to the exemplary embodiments of the FIGS. 3 to 6, is again formed preferably as a torsion-resistant, flexural elastic or axially elastic disk, preferably as a Hardy disk, and is disposed in the internal space 106, 206. Of course, the elastic coupling element 107, 207 may also be formed as a torsion-resistant, flexural elastic or axially elastic ring or annulus and be disposed in the internal space 106, 206. Like the joint yokes 102, 202 with their yoke arms 112, 212, the additional joint yokes 129, 232 are formed substantially U-shaped, when seen in a side view.

Figure 8:
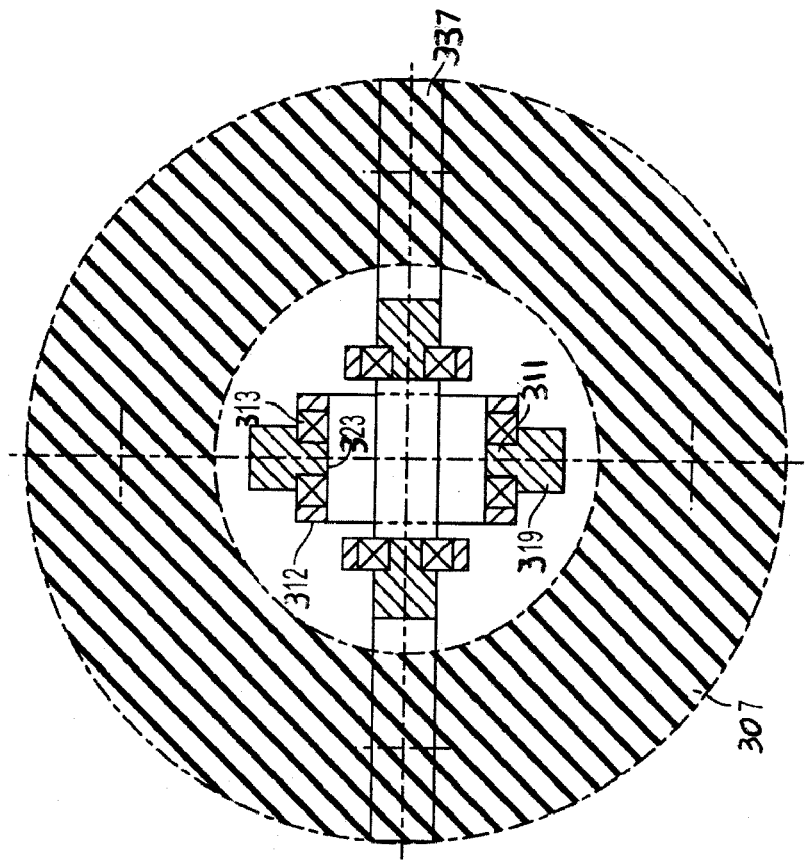
FIG. 8 shows a representation along a section A from FIG. 7.
Figure 7:
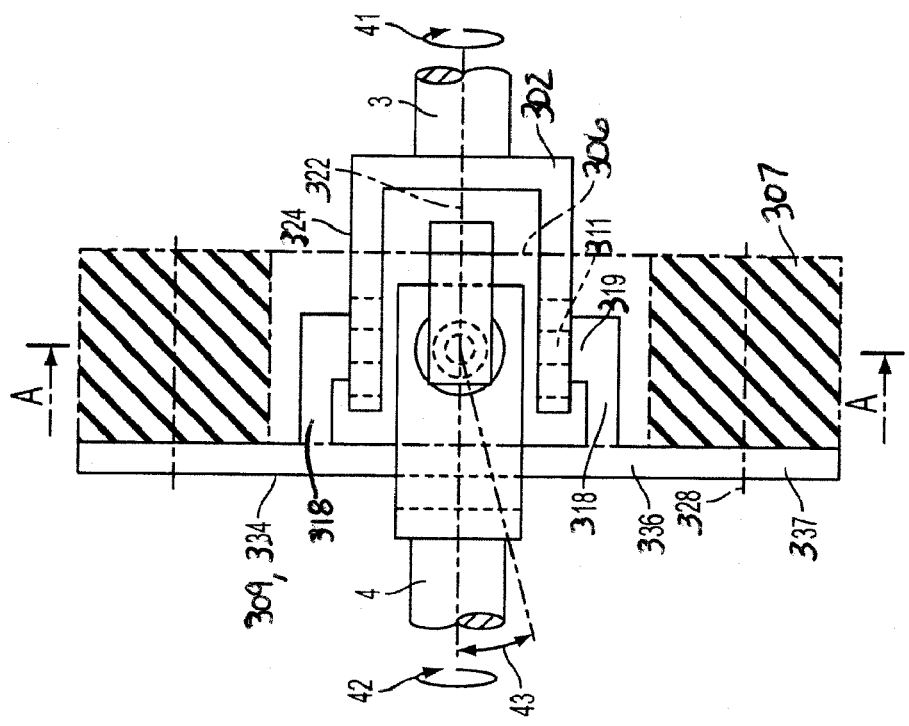
FIG. 7 shows a side view of a universal joint in a fourth embodiment.

A fourth exemplary embodiment of the universal joint according to the invention is shown in the FIGS. 7 and 8.

In this embodiment, the pins 311, in relation to an axis 322 of symmetry each reach counter-directionally into the associated yoke arms 312 or the bearings 313 placed therein, as described in the exemplary embodiment according to FIGS. 1 and 2.

The connection elements 309 are formed as additional connection yokes 334 with a base web 336, which protrudes over the transversal webs 318 with one collar 337, respectively, which is directed away from the axis of symmetry 322. When seen in a side view (FIG. 7), the respective connection yoke 334 is formed corresponding the Greek letter pi, as it were, the transversal webs 318 forming parallel pi-arms outside of the joint yokes 302 or their yoke arms 312.

As in the exemplary embodiment according to the FIGS. 1 and 2, the pins 311 of FIGS. 7 and 8 have free ends 323 that are oriented from an outer side 324 opposite the internal space 306 towards the internal space 306. The pin section 319 and the pin 311 are arranged on the outside of the joint yokes 302 or their yoke arms 312 in relation to the axis of symmetry 322, the pin section 319 abutting a side of the bearings 313 pointing towards the outer side 323. The transversal web 318 grasps the yoke arms 312 so that the pin 311 can reach into the bearings 313 from the outer side 324.

The elastic coupling element 307 is guided around the outer sides 324 of the joint yokes 302 or their yoke arms 312 as a torsion-resistant, flexural elastic or axially elastic ring, or annulus and is connected with the collar 337. The elastic coupling element preferably consists of a rubber, which is why a screw joint, a rivet joint or the like can be selected as a connection. Vulcanization is also possible.

Figure 10:
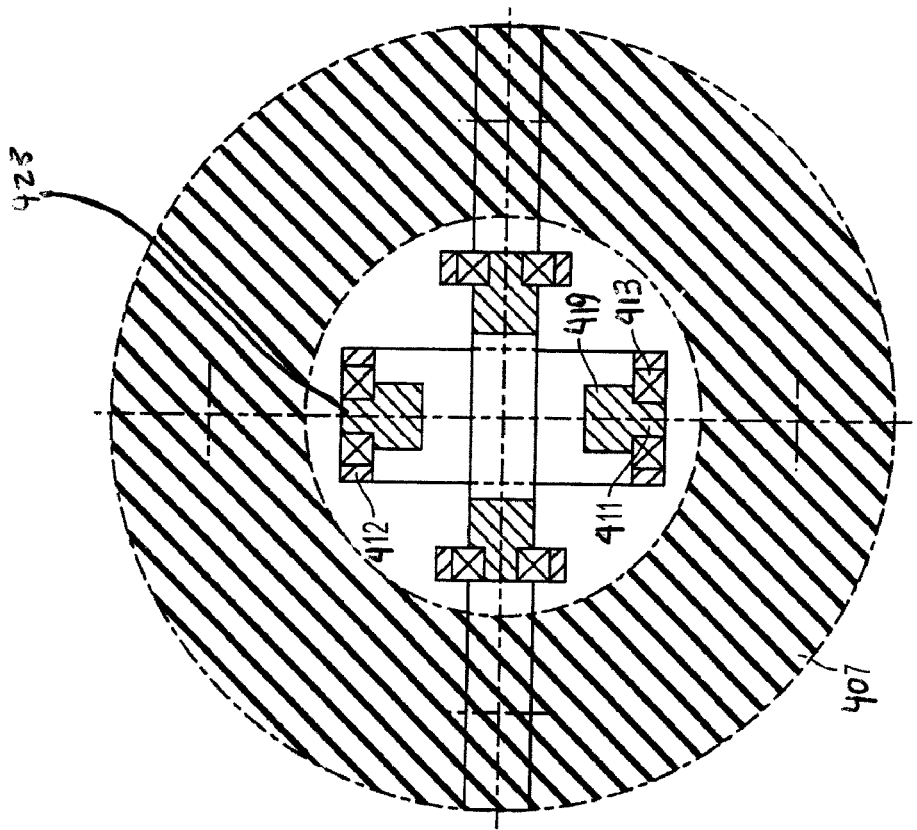
FIG. 10 shows a representation along a section A from FIG. 9.
Figure 9:
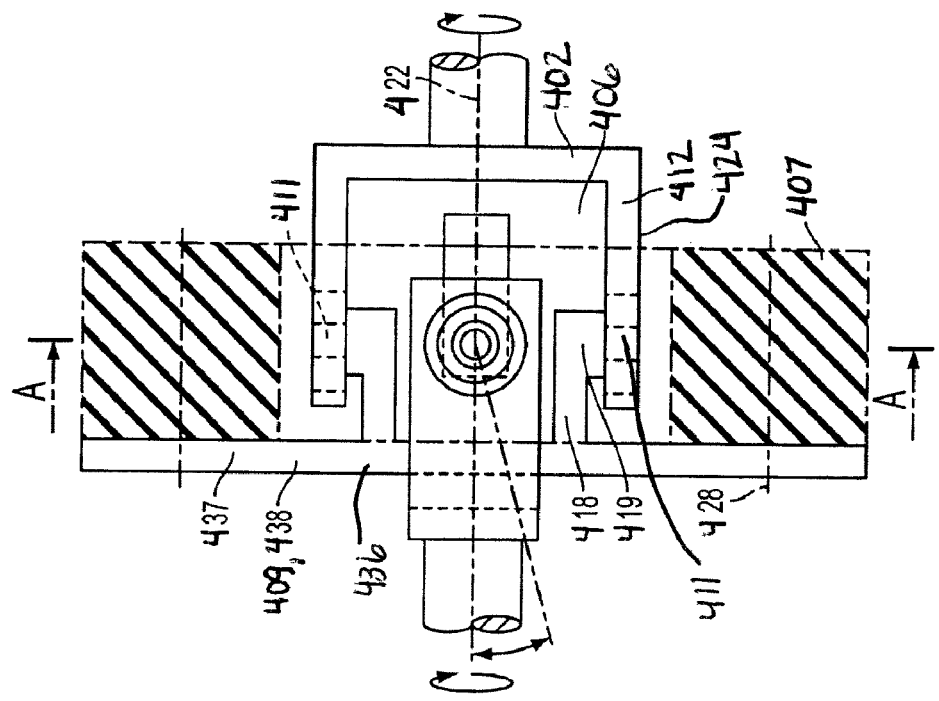
FIG. 9 shows a side view of a universal joint in a fifth embodiment.

A fifth exemplary embodiment of the universal joint according to the invention is shown in the FIGS. 9 and 10. In contrast to the embodiment shown in FIGS. 7 and 8, the pins 411 with their free ends 423 reach into the joint yokes 412 or the bearings placed therein 413 in a direction oriented from the internal space 406 towards the outer side 424 opposite the internal space 406, as described with regard to the exemplary embodiment according to the FIGS. 3 and 4. As in the exemplary embodiment according to FIGS. 7 and 8, the pins 411 of FIGS. 9 and 10, in relation to an axis of symmetry 422, each reach counter-directionally into the respectively associated bearing 413 placed therein.

The connection elements 409 are formed as additional connection yokes 438 with the base web 436. When seen in a side view, the respective connection yoke 438 is formed corresponding to the Greek letter pi, as it were, the transversal webs 418 forming parallel pi-arms within the joint yokes 402 or their yoke arms 412.

Figure 12:
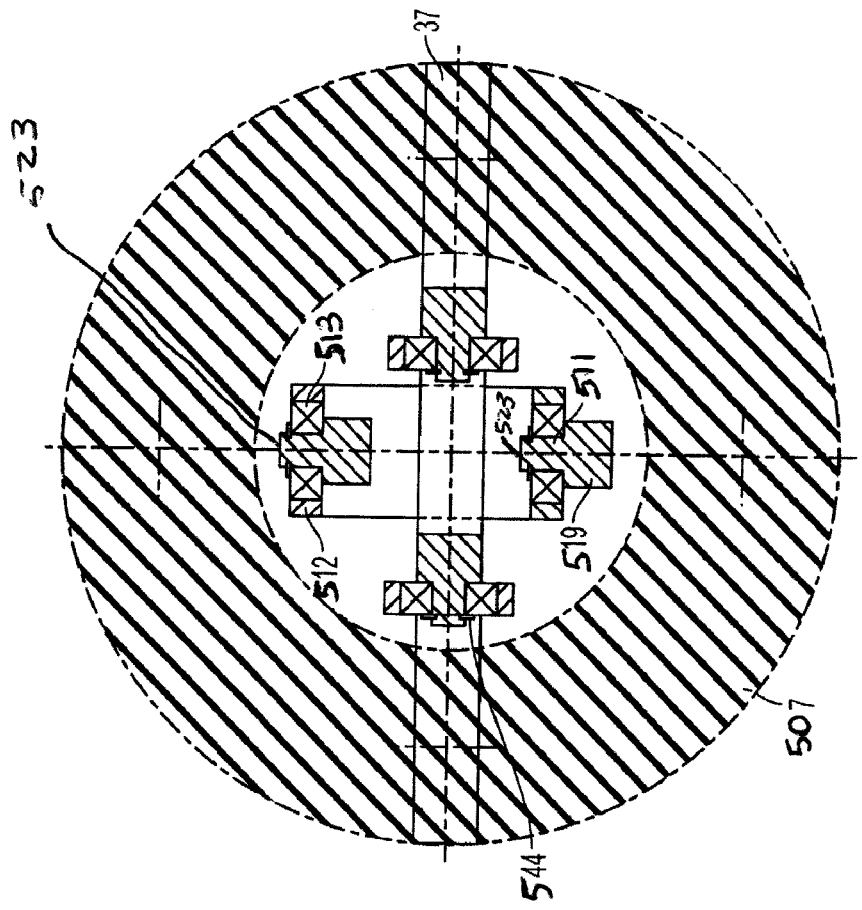
FIG. 12 shows a representation along a section A from FIG. 11.
Figure 11:
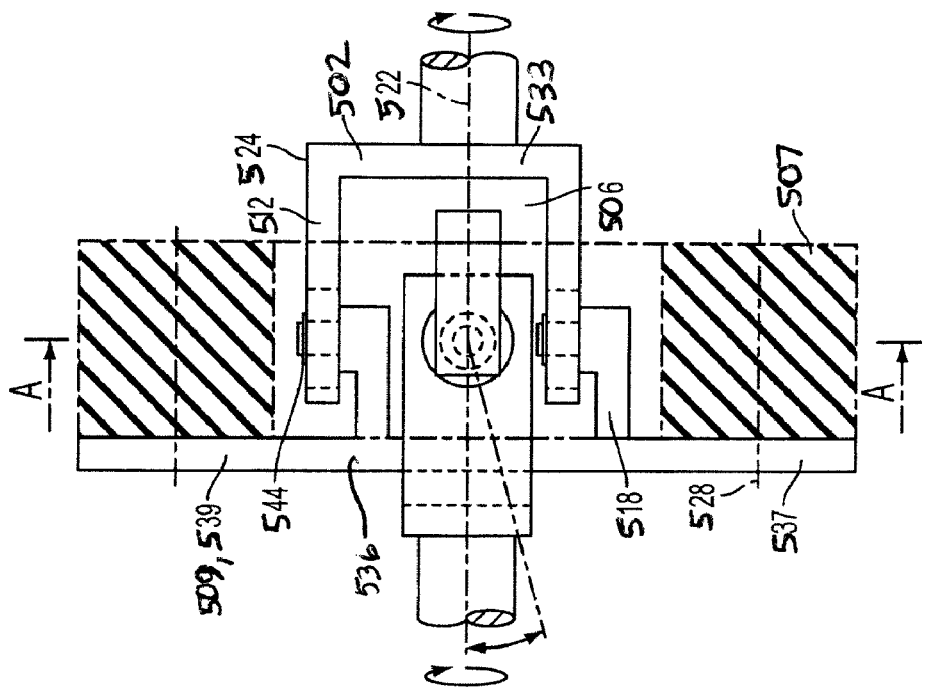
FIG. 11 shows a side view of a universal joint in a sixth embodiment.

A sixth exemplary embodiment of the universal joint according to the invention is shown in the FIGS. 11 and 12. The connection elements 509 are formed as additional connection yoke 539 in a different way than in the explanations of the examples pertaining to FIGS. 7 to 10. Also, the joint yokes 502 are arranged eccentrically in relation to the middle axis of the joint 522, in contrast to the FIGS. 7 to 10.

The joint yoke 539 has a base web 536 on which the transversal web 518 is respectively arranged, which is associated with the pin section 519 with the pin 511. On the base web 536, the collars 537 are arranged again. The pins 511 have their free ends 523 oriented in the same direction, and on one side point towards the middle axis 522 of the joint and on the other side point away from it. One of the pins 511 which points with its free end 523 towards the middle axis 522 of the joint, with its free end 523 reaches into the bearing 513 in a direction from the outer side 524 towards the internal space 506, its opposite pin 511 points with its free end 523 away from the middle axis 522 of the joint, reaching into the bearing 513 in a direction from the internal space 506 towards outer side 524. Therefore, the pins 511 of the same connection yoke 539 reach in to the bearing 513 alternately. On one yoke arm, the pin section 519 abuts the side of the bearing 513 pointing towards the outer side 524. On the other yoke arm, the pin section 519 abuts the side of the bearing 513 pointing towards the internal space 506. Therefore, the connection yoke 539 is supported alternately, namely once on the outside and once on the inside.

In order to obtain this alternate bearing, the connection yoke 539 has the base web 536 which, in relation to the middle axis 522 of the joint, has differently distanced transversal webs 518 so that the transversal webs 518 that are arranged opposite each other are arranged, on the one hand, on the outside, and on the other, on the inside. In the exemplary embodiment shown in FIG. 11, the base web 536 has a length corresponding to the length of the base web 533 of the joint yoke. However, the joint yokes 502, with respect to the respectively associated connection yokes 539, are shifted axially oppositely in relation to the middle axis 522 of the joint.

In the exemplary embodiments according to the FIGS. 9 to 12, the elastic coupling element 407, 507 is again formed as a torsion-resistant, flexural elastic or axially elastic ring, or annulus that is guided around the outer sides 424, 524 of the joint yokes 402, 502 or their yoke arms 412, 512, as described already in the exemplary embodiment according to the FIGS. 7 and 8. The elastic coupling element 407, 507 is respectively connected with the collar 437, 537 that is arranged on both sides of the middle axis 422, 522 of the joint. A screw joint, rivet joint, vulcanization or the like can be provided as the connection.

In the universal joint according to the exemplary embodiments of FIGS. 1 to 12, an input moment (direction of rotation 41) is transmitted via the driven shaft 3 (drive shaft) via the joint yoke 2, 102, 202, 302, 402, 502 onto the pair of connection elements pivoted therein or onto the connection elements respectively supported in the opposite joint arms 12, 102, 202, 302, 402, 502, and thence, as tensile/compression stress, onto the elastic coupling means 7, 107, 207, 307, 407, 507 to the crossing connection elements and then on to the joint yoke 2, 102, 202, 302, 402, 502 of the shaft 4 to be driven or drive shaft. This is represented by means of the output moment (direction of rotation 42) that is equidirectional with the input moment (direction of rotation 41). With regard to the bending stiffness required to a small degree, the elastic coupling element 7, 107, 207, 307, 407, 507 is selected such that it is ensured that a rotation of the connection element or its pin can take place during an inclination (inclination 43) and rotation of the joint yoke 2, 102, 202, 302, 402, 502, in order to overcome the friction torque according to the selected bearing clearance in the bearings 13, 113, 213, 313, 413, 513. In an axial direction, the elastic coupling element 7, 107, 207, 307, 407, 507 thus permits a compliance that can be used for insulation, while the contour of the elastic coupling element 7, 107, 207, 307, 407, 507 provides a high torsional stiffness.

Advantageously, the universal joint can be formed smaller if formed according to FIGS. 7 to 12, with a coupling element 307, 407, 507 formed as a ring, than if formed according to the example pertaining to the FIGS. 1 to 6, while an axial flexibility can be increased at the same rotational stiffness.

The universal joint shown in the FIGS. 1 to 12 is particularly suitable for use in a steering column of a motor vehicle. The shafts 3 and 4 are shown oriented in alignment towards each other. In the vehicle, there usually is an angled position, relative to each other, with the universal joint maintaining the transmission of the rotation. The angled position is shown in FIGS. 1 and 3 by means of the angle of inclination 43.

Furthermore, a securing element 244, 544 that can be associated with the respective free end 23, 123, 223, 323, 423, 523 of the pin 11, 111, 211, 311, 411, 511 is provided in the FIGS. 5, 6, 11 and 12. The securing element 244, 544 may, for example, be formed as a shaft securing ring. For supporting the securing element 244, 544 at the pin 11, 111, 211, 311, 411, 511, a groove may be placed in the pin 11, 111, 211, 311, 411, 511 at a suitable location. Of course, such a securing element can be provided in all other exemplary embodiments.

What is claimed is:

1. A universal joint for coupling a drive shaft and a driven shaft, the universal joint comprising:

a first joint yoke having axially opposite yoke arms;

a second joint yoke having axially opposite yoke arms and arranged radially at an angle of 90° in relation to the first joint yoke to form an internal space within the yoke arms;

first and second connection elements, each connection element having pins and
transverse arms for connecting the connection element to yoke arms of a respective joint yoke, and
a base web comprising collars extending beyond the transverse arms in a direction away from an axis of symmetry of the joint; and an elastic coupling element guided around outer sides of the joint yokes and connected to the collars of the base web of each connection element,
wherein the pins of each of the connection elements, in relation to the axis of symmetry the joint, are oriented counter-directionally into a respective yoke arm of the joint.

2. The universal joint of claim 1, wherein the elastic coupling element has a ring-shaped cross section.

3. The universal joint of claim 1, wherein the elastic coupling element comprises a torsion-resistant, axially elastic ring.

4. The universal joint of claim 1, wherein the elastic coupling element is connected with the connection elements by vulcanization.

5. A universal joint for coupling a drive shaft and a driven shaft, the universal joint comprising:
a first joint yoke having axially opposite yoke arms;
a second joint yoke having axially opposite yoke arms and arranged radially at an angle of 90° in relation to the first joint yoke to form an internal space within the yoke arms:
first and second connection elements, each connection element having
transverse arms for connecting the connection element to yoke arms of a respective joint yoke, and
a base web comprising collars extending beyond the transverse arms in a direction away from an axis of symmetry of the joint; and
an elastic coupling element guided around outer sides of the joint yokes and connected to the collars of the base web of each connection element,
wherein bearings are disposed in the yoke arms of the first and second joint yokes, and the first and second connection elements comprise pins configured to extend into respective bearings in a direction oriented from an outer side of the yoke arms opposite the internal space toward the internal space.

6. The universal joint of claim 5, wherein the transverse arms grasp the yoke arms so that the pins can reach into the bearings from the outer side of the yoke arms.

7. A universal joint for coupling a drive shaft and a driven shaft, the universal joint comprising:
first and second joint yokes, each joint yoke having axially opposite yoke arms, and inner and outer sides with respect to an axis of symmetry of the joint;
first and second connection elements, each connection element having pins and
transverse arms for connecting the connection element to yoke arms of a respective joint yoke, and
a base web extending beyond the transverse arms in a direction away from the axis of symmetry of the joint; and
an elastic coupling element guided around outer sides of the joint yokes and connected to the base web of each connection element at a location beyond the transverse arms in a direction away from the axis of symmetry of the joint,
wherein the pins of each of the connection elements, in relation to the axis of symmetry the joint, are oriented counter-directionally into a respective yoke arm of the joint.

8. The universal joint of claim 7, wherein the elastic coupling element has a ring-shaped cross section.

9. The universal joint of claim 7, wherein the elastic coupling element comprises a torsion-resistant, axially elastic ring.

10. The universal joint of claim 7, wherein the elastic coupling element is connected with the connection elements by vulcanization.

11. A universal joint for coupling a drive shaft and a driven shaft, the universal joint comprising:
first and second joint yokes, each joint yoke having axially opposite yoke arms, and inner and outer sides with respect to an axis of symmetry of the joint;
first and second connection elements, each connection element having
transverse arms for connecting the connection element to yoke arms of a respective joint yoke, and
a base web extending beyond the transverse arms in a direction away from the axis of symmetry of the joint; and
an elastic coupling element guided around outer sides of the joint yokes and connected to the base web of each connection element at a location beyond the transverse arms in a direction away from the axis of symmetry of the joint,
wherein bearings are disposed in the yoke arms of the first and second joint yokes, and the first and second connection elements comprise pins configured to extend from the transverse arms into respective bearings in a direction oriented from an outer side of the joint yoke to an inner side of the joint yoke.

12. The universal joint of claim 11, wherein the transverse arms grasp the yoke arms so that the pins can reach into the bearings from the outer side of the yoke arms.

13. A universal joint for coupling a drive shaft and a driven shaft, the universal joint comprising:
first and second joint yokes, each joint yoke having axially opposite yoke arms and inner and outer sides with respect to an axis of symmetry of the joint;
first and second connection elements, each connection element having
transverse arms for connecting the connection element to yoke arms of a respective joint yoke, and
a base web connected to and extending beyond the transverse arms in a direction away from the axis of symmetry of the joint; and
an elastic coupling element guided around outer sides of the joint yokes and connected to the base web of each connection element at a location beyond the transverse arms in a direction away from the axis of symmetry of the joint such that there is a space between the elastic coupling element and each of the transverse arms
wherein the first and second connection elements comprise pins, and the pins of each of the connection elements, in relation to the middle axis of the universal joint reach, are oriented counter-directionally, into a respective yoke arm of the joint.

14. The universal joint of claim 13, wherein the elastic coupling element has a ring-shaped cross section.

15. The universal joint of claim 13, wherein the elastic coupling element comprises a torsion-resistant, axially elastic ring.

16. A universal joint for coupling a drive shaft and a driven shaft, the universal joint comprising:

first and second joint yokes, each joint yoke having axially opposite yoke arms and inner and outer sides with respect to an axis of symmetry of the joint;

first and second connection elements, each connection element having transverse arms for connecting the connection element to yoke arms of a respective joint yoke, and a base web connected to and extending beyond the transverse arms in a direction away from the axis of symmetry of the joint; and an elastic coupling element guided around outer sides of the joint yokes and connected to the base web of each connection element at a location beyond the transverse arms in a direction away from the axis of symmetry of the joint such that there is a space between the elastic coupling element and each of the transverse arms, wherein bearings are disposed in the yoke arms of the first and second joint yokes, and the first and second connection elements comprise pins configured to extend into respective bearings in a direction away from the space between the elastic coupling element and each of the transverse arms.

17. The universal joint of claim 16, wherein the transverse arms grasp the yoke arms so that the pins can reach into the bearings from the outer side of the yoke arms.

* * * * *